United States Patent [19]

Danley

[11] Patent Number: 4,757,833

[45] Date of Patent: Jul. 19, 1988

[54] METHOD FOR IMPROVING PRODUCTION OF VISCOUS CRUDE OIL

[75] Inventor: Dennis E. Danley, Ledyard, Conn.

[73] Assignee: Pfizer Inc., New York, N.Y.

[21] Appl. No.: 47,950

[22] Filed: May 8, 1987

Related U.S. Application Data

[63] Continuation-in-part of Ser. No. 790,916, Oct. 24, 1985, abandoned.

[51] Int. Cl.$^4$ .......................... F17D 1/17; B01F 17/00
[52] U.S. Cl. .................................... 137/13; 252/8.551; 252/312
[58] Field of Search ................ 137/13; 252/8.551, 8.3, 252/8.554, 312

[56] References Cited

U.S. PATENT DOCUMENTS

| | | | |
|---|---|---|---|
| 2,528,378 | 10/1950 | Mannheimer | 252/542 X |
| 2,773,068 | 12/1956 | Mannheimer | 252/542 X |
| 3,380,531 | 5/1967 | McAuliffe et al. | 166/45 |
| 3,467,195 | 9/1969 | McAuliffe et al. | 166/314 |
| 3,491,835 | 1/1970 | Gagle | 137/13 X |
| 3,945,437 | 3/1976 | Chiu et al. | 252/8.55 X |
| 4,108,193 | 8/1978 | Flournoy et al. | 137/13 |
| 4,152,290 | 5/1979 | Flournoy et al. | 252/355 |
| 4,153,573 | 5/1979 | Kalfoglou et al. | 252/312 |
| 4,153,575 | 5/1979 | Kalfoglou et al. | 252/352 |
| 4,162,989 | 7/1979 | Flournoy et al. | 252/312 |
| 4,192,767 | 3/1980 | Flournoy et al. | 252/312 |
| 4,214,999 | 7/1980 | Carlin et al. | 252/8.55 |
| 4,239,052 | 12/1980 | McClaflin | 137/13 |
| 4,246,919 | 1/1981 | McClaflin | 137/13 |
| 4,249,554 | 2/1981 | McClaflin | 137/13 |
| 4,265,264 | 5/1981 | Sifferman | 137/13 |
| 4,285,356 | 8/1981 | Sifferman | 137/13 |
| 4,618,348 | 10/1986 | Hayes et al. | 44/51 |
| 4,684,372 | 8/1987 | Hayes et al. | 44/51 |

OTHER PUBLICATIONS

McCutcheon's Detergents and Emulsifiers, 1973 North American Edition, p. 51.

*Primary Examiner*—Herbert B. Guynn
*Attorney, Agent, or Firm*—Peter C. Richardson; Albert E. Frost; Gregg C. Benson

[57] ABSTRACT

A method for improving the mobility and pipeline transport of a viscous crude oil by forming an oil-in-water emulsion with said oil and from 10 to 80% by weight of water in the presence of 100 to 1500 parts by weight of a surfactant blend per million parts by weight of said emulsion, said blend comprising from 15 to 85 parts by weight of an anionic or amphoteric surfactant (A) selected from those of the formulae $Ar(OCH_2CH_2)_nOSO_3H$,

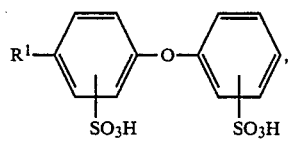

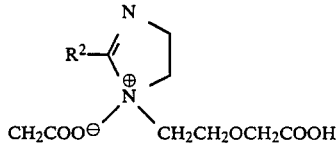

a sodium and ammonium salt thereof, and from 85 to 15 parts by weight of a nonionic surfactant selected from (B) of the formula $Ar(OCH_2CH_2)_pOH$ or (C) of the formula

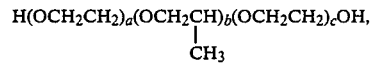

the latter having an HLB value of from 10 to 20; where
Ar is octylphenyl or nonylphenyl,
n is 2 to 10,
p is 10 to 100,
a is 10 to 40, b is 15 to 55, c is 10 to 40,
$R^1$ is $C_8$ to $C_{18}$ alkyl and
$R^2$ is $C_{12}$ to $C_{18}$ alkyl;
and said emulsion.

15 Claims, No Drawings

METHOD FOR IMPROVING PRODUCTION OF VISCOUS CRUDE OIL

CROSS REFERENCE TO RELATED APPLICATION

This application is a continuation-in-part of copending application Ser. No. 790,916, filed Oct. 24, 1985, now abandoned.

BACKGROUND OF THE INVENTION

The invention relates to methods for improving the production rate of a viscous crude oil by forming an oil-in-water emulsion with blends of certain surfactants.

The pumping of viscous crude oils from production wells and subsequent pipeline transport is difficult because of the low mobility of the oil. Prior methods for overcoming this problem included addition of lighter hydrocarbons, such as kerosine or light condensate, and heating the crude oil. These prior art methods are expensive and wasteful of energy.

Still another method of reducing the viscosity of heavy crude oils is by means of an oil-in-water emulsion. The following patents disclose such methods using a variety of agents to form emulsions for this purpose: Nos.
U.S. 3,380,531;
U.S. 3,467,195;
U.S. 4,108,193;
U.S. 4,152,290;
U.S. 4,153,573;
U.S. 4,153,575;
U.S. 4,162,989;
U.S. 4,192,767 and
U.S. 4,214,999.
However, each of these methods has serious drawbacks in that, for example, the resulting emulsion is still relatively viscous, they require heating to give an emulsion of sufficiently low viscosity, or subsequent separation of oil is difficult.

U.S. Pat. No. 4,239,052 discloses the use of a combination of an ethoxylated alkylphenol and a low molecular weight alkylaryl sulfonate to reduce the viscosity of viscous hydrocarbons. U.S. Pat. No. 4,246,919 discloses a method employing a combination of an ethoxylated alkylphenol and an ethoxylated polypropylene glycol. U.S. Pat. No. 4,249,554 discloses an emulsion from using a combination of an ethoxylated alkylphenol and a salt of an ethoxylated alcohol sulfate. U.S. Pat. No. 4,265,264 relates to a method employing a combination of a salt of an ethoxylated alcohol sulfate and certain polyoxyethylene polyoxypropylene copolymers or an ethoxylated alcohol. U.S. Pat. No. 4,285,356 discloses a method for reducing the viscosity of viscous hydrocarbons by forming an emulsion with a combination of certain alkylpolyether ethoxylated sulfates and an alcohol ether sulfate.

SUMMARY OF THE INVENTION

The present invention relates to a method having distinct advantages over those of the prior art in that (1) oil-in-water emulsions of very low viscosity at ambient temperature are obtained; (2) said emulsions afford marked improvement in the productivity of wells producing viscous crude oils; (3) said emulsions are unexpectedly more stable than those from prior art compositions, making them preferred for pipeline transport. Thus, the invention discloses a method for improving the mobility of a viscous crude oil and a method for transporting a viscous crude oil through a pipeline, where each of said methods comprises forming an oil-in-water emulsion containing from 20 to 80 percent by weight of the viscous crude oil and 80 to 20 percent by weight of water in the presence of from 100 to 1500 parts by weight of a surfactant blend per million parts by weight of said emulsion, where said blend comprises from 15 to 85 parts by weight of an anionic or amphoteric surfactant (A) which is selected from those of the formulae

  (A$^1$)

  (A$^2$)

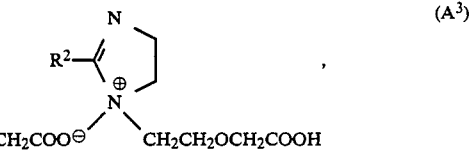  (A$^3$)

a sodium and ammonium salt thereof; and from 85 to 15 parts by weight of a nonionic surfactant selected from those of the formula (B) Ar(OCH$_2$CH$_2$)$_p$OH, or

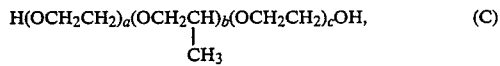  (C)

said surfactant (C) having an HLB value of from 10 to 20;

where Ar is octylphenyl or nonylphenyl,
n is a number from 2 to 10,
p is a number from 10 to 100,
a is a number from 10 to 40,
b is a number from 15 to 55,
c is a number from 10 to 40,
R$^1$ is C$_8$ to C$_{18}$ alkyl and
R$^2$ is C$_{12}$ to C$_{18}$ alkyl.

The invention also relates to an emulsion formed by the above methods.

In the above emulsion and methods for its use, a particularly preferred amount of oil present in the emulsion is from 50 to 75 percent by weight, the remaining part (50 to 25 percent by weight) being water. A particularly preferred blend of surfactants comprises from 20 to 80 parts by weight of said surfactant (A) and from 80 to 20 parts by weight of said surfactant (B) or said surfactant (C).

An especially preferred emulsion for the methods of the invention are those wherein said blend comprises from 50 to 80 parts by weight of surfactant (A) and from 50 to 20 parts by weight of surfactant (B).

A particularly preferred amount of said surfactant blend employed in the emulsion is from 200 to 1000 parts by weight of said blend per million parts by weight of said emulsion.

A class of particularly preferred surfactant blends are those wherein (A) is an anionic surfactant selected from (A$^1$), (A$^2$) or (A$^3$), as defined above, or a sodium or ammonium salt thereof and said nonionic surfactant is (B), as defined above; also included in said class are blends wherein (A) is the anionic surfactant (A¹), as defined above, and said nonionic surfactant is (C), as defined above, but having an HLB value of from 12 to 16.

Specific surfactant blends that are especially preferred for preparation of the emulsions of the invention and for carrying out the invention methods are those having the following active ingredients and wherein said blend comprises from 20 to 80 parts by weight of the stated surfactant (A) and from 80 to 20 parts by weight of the stated surfactant (B) or (C):

1.
(A¹) The sodium or ammonium salt of 4-$C_9H_{19}C_6H_4(OCH_2CH_2)_4OSO_3H$ and
(B) 4-$C_8H_{17}C_6H_4(OCH_2CH_2)_{70}OH$;

2.
(A¹) The sodium or ammonium salt of 4-$C_9H_{19}C_6H_4(OCH_2CH_2)_4OSO_3H$ and
(B) 4-$C_8H_{17}C_6H_4(OCH_2CH_2)_{30}OH$;

3.
(A¹) The sodium or ammonium salt of 4-$C_9H_{19}C_6H_4(OCH_2CH_2)_4OSO_3H$ and $$H(OCH_2CH_2)_{11}(OCH_2\underset{\underset{CH_3}{|}}{CH})_{21}(OCH_2CH_2)_{11}OH \qquad (C)$$

having an HLB of 16;

4.
(A¹) The sodium or ammonium salt of 4-$C_9H_{19}C_6H_4(OCH_2CH_2)_4OSO_3H$ and
(B) 4-$C_9H_{19}C_6H_4(OCH_2CH_2)_{100}OH$;

5.
(A¹) The sodium or ammonium salt of 4-$C_9H_{19}C_6H_4(OCH_2CH_2)_4OSO_3H$ and
(B) 4-$C_8H_{17}C_6H_4(OCH_2CH_2)_{10}OH$;

6.
(A³) The sodium or ammonium salt of the amphoteric surfactant

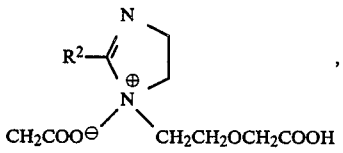

where R² is $C_{12}$ to $C_{18}$ alkyl and
(B) 4-$C_8H_{17}C_6H_4(OCH_2CH_2)_{30}OH$;

7.
(A²) The disodium salt of

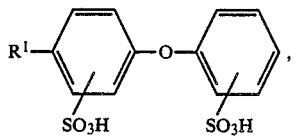

where R¹ is $C_8$ to $C_{18}$ alkyl and
(B) 4-$C_9H_{19}C_6H_4(OCH_2CH_2)_{100}OH$;

8.
(A¹) The sodium or ammonium salt of 4-$C_9H_{19}C_6H_4(OCH_2CH_2)_4OSO_3H$ and 4-$C_9H_{19}C_6H_4(OCH_2CH_2)_{30}OH$.

DETAILED DESCRIPTION OF THE INVENTION

As noted above the invention relates to a method for increasing the productivity of a viscous crude oil by improving the mobility of the oil at the wellhead and its transport through pipelines by forming an oil-in-water emulsion with certain novel blends of surfactants.

The surfactants and mixtures thereof were screened initially in the laboratory for those having the ability to form oil-in-water emulsions of substantially reduced viscosity at ambient temperature and also having adequate stability to allow for transporting the emulsion to the site of oil recovery. Preferred emulsions, of course, would not be so stable that subsequent oil separation would be difficult. Thus, the ideal emulsion is one that is highly mobile at ambient temperature at the wellhead and during transport, and readily gives substantially complete oil separation at the recovery site.

The laboratory testing was carried out by forming oil-in-water emulsions with samples of various viscous crude oils and measuring their viscosity and emulsion stability by methods well known in the art. These tests were carried out employing either water or a brine as the aqueous phase. The brines employed were either natural brines obtained from a well site or synthetic brines which simulated those which occur naturally.

As a result of these tests it was found that blends of certain known anionic or amphoteric surfactants designated herein as surfactant (A) with certain known nonionic surfactants, designated herein as either surfactant (B) or surfactant (C), gave oil-in-water emulsions that demonstrated superior mobility at ambient temperature and had the desired stability, indicated above.

The anionic or amphoteric surfactant designated as (A) in the above-mentioned surfactant blends is selected from those of the formulae (A¹): $Ar(OCH_2CH_2)_nOSO_3H$, where Ar is octylphenyl or nonylphenyl and n is a number from 2 to 10 which represents the average number of ethylene oxide units, a sodium and ammonium salt thereof;

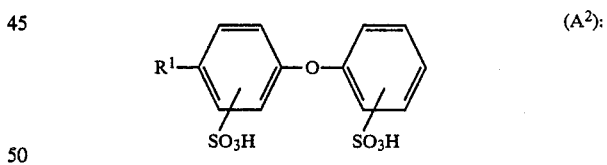

a sodium and ammonium salt thereof, where R¹ is straight chain or branched $C_8$ to $C_{18}$ alkyl;

and (A³):

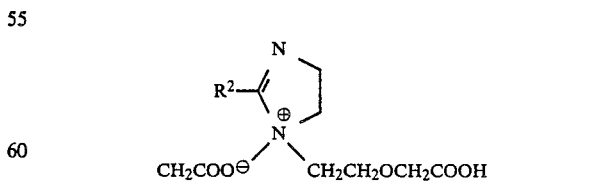

a sodium and ammonium salt thereof, where R² is a straight chain or branched $C_{12}$ to $C_{18}$ alkyl.

The nonionic surfactant designated as (B) in the above-mentioned surfactant blends is selected from those of the formula $Ar(OCH_2CH_2)_pOH$ where Ar is as previously defined and p is a number from 10 to 100 which represents the average number of ethylene oxide units.

The alternatively used nonionic surfactant designated as (C) in the above-mentioned surfactant blends is selected from the block copolymers of the formula

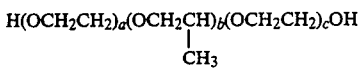

where a and c represent average numbers of the terminal ethylene oxide units and b represents the average number of propylene oxide units in the central block.

Examples of suitable surfactants (A$^1$), above, which are commercially available include Alipal®CO-433 and Alipal®CO-436 available from GAF Corporation, New York, NY 10020. Other suppliers of surfactants (A$^1$) wherein the average value of n is from 2 to 10 include Witco Chemical Corporation, New York, NY 10022; Onyx Chemical Company, Jersey City, NJ 07302; Conoco Chemicals, Houston, Texas and Rohm and Haas Co., Philadelphia, PA 19105.

Examples of suitable surfactants (A$^2$), above, which are commercially available include Eleminol®MON-7 from Sanyo Chemical Industries, Ltd., Kyoto, Japan; and the Dowfax® surfactants 2A0, 2A1 and 3B2 from Dow Chemical U.S.A., Specialty Chemicals Department, Midland, Mich. 48640.

Examples of suitable surfactants (A$^3$), above, which are commercially available include Miranol®C2MSF, Miranol®H2M, Miranol®L2M-SF, Miranol®O2M and Miranol®C2M available from Miranol Chemical Company, Dayton, NJ, 08810; and Cycloteric®DC-SF from Cyclo Chemical Corp., Miami, Fla.

Suitable nonionic surfactants (B) which are commercially available include Triton®X-100, Triton®X-305, Triton®X-405, Triton®X-705 and Triton®N-998, containing respectively an average of 10, 30, 40, 70 and 100 oxyethylene units, available from Rohm and Haas Co., Philadelphia, PA 19105; T-DET®N-407 and T-DET®507 from Thompson Hayward, Kansas City, KS 66110 and Tergitol®NP-40 From Union Carbide Corp., Danbury, CT 06817.

Suitable nonionic surfactants (C), above, which are commercially available include several of the Pluronic® Surfactants from BASF Wyandotte Corp., Wyandotte, Mich. 48192, including Pluronic®L35 (HLB 18.5), L43 (HLB 12), L44 (HLB 16), P65 (HLB 17), L64 (HLB 17), L63 (HLB 11), P75 (HLB 16.5), P85 (HLB 16), P84 (HLB 14), P94 (HLB 13.5), P104 (HLB 13) and P105 (HLB 15). As is well known in the art of surface active agents, HLB is the hydrophile-lipophile balance, which is a measure of the relative simultaneous attraction of an emulsifying agent for the two phases (oil and water) in an emulsion system. The higher HLB values are indicative of higher hydrophilicity.

Assuming facile separation of phases in each case, it will be recognized by one of skill in the art that the higher the level of oil in the emulsions of the invention, the more efficient the recovery process will be. Thus, effective emulsions of the invention are those containing from 20 parts by weight of oil and 80 parts by weight of water to those having 80 parts by weight of oil and 20 parts by weight of water. Especially preferred emulsions are those having from 50 to 75 parts by weight of oil and from 50 to 25 parts by weight of water. Of course, as indicated above, the "water" employed in the emulsion can be either fresh water, containing little or no dissolved solids, or a brine, containing relatively high levels (up to 15% by weight) of total dissolved solids (TDS), including ordinary salt. In most cases, the "water" employed in the emulsion is that water produced from the well along with the heavy crude oil.

In some instances the fluid produced by a well is a very viscous water-in-oil emulsion. It has been found that upon introduction of a surfactant blend of the invention down the well annulus with moderate downhole mixing, the viscous water-in-oil emulsion will invert to form a very low viscosity oil-in-water emulsion.

While the concentration of the surfactant blend, which is based on the emulsion weight, may vary over a wide range, preferred concentrations are those within the range of 100 to 1500 parts by weight of surfactant blend per million parts by weight of emulsion, and especially preferred blends are those having from 200 to 1000 parts by weight of surfactant per million parts by weight of emulsion.

In all cases herein the parts of surfactant refers to the parts of active ingredient, excluding inert diluents ordinarily employed in their formulations, e.g. water.

Preferred surfactant blends are those comprising from 20 to 80 parts by weight of surfactant (A) and 80 to 20 parts by weight of either surfactant (B) or surfactant (C) and especially preferred are those having from 50 to 80 parts by weight of surfactant (A) and 50 to 20 parts by weight of the remaining active ingredient (B) or (C).

The following Examples are illustrative of the invention.

EXAMPLE 12

Viscosity Reduction and Emulsion Stability of a 13.5–15 API Gravity California Crude Oil With Various Emulsifying Agents Method:

The crude oil sample, 280 g, brine*, 120 g, and emulsifying agent, 0.224 g (560 ppm based on weight of emulsion), were placed in a blender and mixed at a high shear speed for 30 seconds. The viscosity of the resulting emulsion was measured with a Brookfield LVTD Viscometer at spindle speeds of 6, 12, 30 and 60 rpm. A 100 ml portion of the emulsion was poured into a graduated cylinder and allowed to stand at 25° C. After six hours, each cylinder was inverted three times in order to redisperse the mixture. The viscosity was remeasured and recorded. The extent of viscosity reduction and the ease of redispersibility after standing are measures of the amount of coalescence of the oil phase and are thus a measure of the stability of the emulsion. The results are summarized in the table below.

*The brine contained 10% by weight total dissolved solids (TDS) and 1% hardness.

| Emulsifying Agent[1] | Thinning Effectiveness, Initial Viscosity at 25° C. (centipoise) | Emulsion Stability, Viscosity after 6 hours at 25° C. (centipoise)[2] |
| --- | --- | --- |
| None | 20,000 | N.A. |
| Surfactant I | 9,450 | N.A. |
| Surfactant II | 200 | 4,200 |
| (U.S. Pat. No. 3,491,835) | | |
| Surfactant III | 250 | 5,200 |
| Surfactant IV | 200 | 5,000 |
| Surfactant V | 180 | 6,800 |
| (U.S. Pat. No. 3,491,835) | | |
| Surfactant VI | 400 | 5,500 |

-continued

| | | |
|---|---|---|
| (Blend of U.S. Pat. No. 4,239,052) | | |
| Surfactant VII | 320 | 5,840 |
| (Blend of U.S. Pat. No. 4,249,554) | | |
| Blend 1 (I + III) | 200 | 4,400 |
| Blend 2 (I + II) | 300 | 1,100 |
| Blend 3 (I + V) | 300 | 1,700 |

| Surfactant | Chemical Name and Formula |
|---|---|
| I | Nonylphenoxytri(ethyleneoxy)ethanol sulfate - $C_9H_{19}C_6H_4(OCH_2CH_2)_3OCH_2CH_2OSO_3H$, (Alipal CO-436, GAF Corp., New York, New York 10020). |
| II | Octylphenoxypoly(ethyleneoxy)ethanol (30 moles ethylene oxide) - $C_8H_{17}C_6H_4(OCH_2CH_2)_{30}OH$, (Triton X-305, Rohm and Haas, Philadelphia, Pennsylvania 19105). |
| III | Octylphenoxypoly(ethyleneoxy)ethanol (70 moles ethylene oxide) - $C_8H_{17}C_6H_4(OCH_2CH_2)_{70}OH$, (Triton X-705, Rohm and Haas, Philadelphia, Pennsylvania 19105). |
| IV | Nonylphenoxypoly(ethyleneoxy)ethanol (100 moles ethylene oxide) - $C_9H_{19}C_6H_4(OCH_2CH_2)_{100}OH$, (Triton N-998, Rohm and Haas, Philadelphia, Pennsylvania 19105). |
| V | Block copolymer of ethylene oxide and propylene oxide (40% ethylene oxide), HLB = 16, $H(OCH_2CH_2)_{11}(OCH_2CH)_{21}(OCH_2CH_2)_{11}OH$, $\quad\quad\quad\quad\quad\quad\quad\quad\quad\quad\ \ |$ $\quad\quad\quad\quad\quad\quad\quad\quad\quad\quad\ \ CH_3$ (Pluronic L-44, BASF Wyandotte Corp., Wyandotte, Michigan 48192). |
| VI | Dodecylbenzenesulfonate and nonylphenoxypoly(ethyleneoxy)ethanol - $C_{12}H_{25}C_6H_4SO_3H$ and $C_9H_{19}C_6H_4(OCH_2CH_2)_{40}OH$ 50/50 blend. |
| VII | Alfonic 1412-A ®** $[C_{12-14}H_{25-29}(OCH_2CH_2)_3OSO_3NH_4]$ plus T-DET-N407 ®** $[C_9H_{19}C_6H_4(OCH_2CH_2)_{40}OH]$ 50/50 blend (w/w). |
| Blend 1 | 50/50 (w/w) blend of surfactants I and III, above. |
| Blend 2 | 50/50 (w/w) blend of surfactants I and II, above. |
| Blend 3 | 50/50 (w/w) blend of surfactants I and V, above. |

[1]560 ppm of active surfactant below based on weight of emulsion.
[2]N.A. = Not applicable
**Alfonic is a registered trademark of Conoco Chemicals. T-DET is a registered trademark of Thompson Hayward Chemical Co.

EXAMPLE 1A

Viscosity Reduction and Emulsion Stability of a Western Canada Bitumen with Various Emulsifying Agents Method:

The crude oil (viscosity at 25° C. of 126,000 centipoise) sample, 280 g, brine (10% by weight total dissolved solids, 1% hardness), 120 g, and emulsifying agent, 0.188–0.224 g (470–560 ppm based on weight of emulsion), were placed in a blender and mixed at a high shear speed for 30 seconds. The viscosity of the resulting emulsion was measured with a Brookfield LVTD viscometer, #2 spindle at 6 rpm. A 100 ml portion of the emulsion was poured into a graduated cylinder and allowed to stand at 25° C. After two hours and six hours, each cylinder was inverted three times in order to redisperse the mixture. The viscosity was remeasured and recorded. The extent of viscosity reduction and ease of redispersion after standing are measures of the amount of coalescence of the oil phase and are thus a measure of the stability of the emulsion. The results are summarized in the table below. Only Blend 8, an example of the instant invention, gave acceptable performance.

| | | Thinning Effectiveness: Initial Viscosity cP, 25° C. | Emulsion Stability: Viscosity, cP, 25° C. after | |
|---|---|---|---|---|
| Emulsifying Agent* | Concentration | | 2 Hours | 6 Hours |
| None | 0 ppm | >5000 | >5000 | >5000 |
| Surfactant II of Example 1 (U.S. Pat. No. 3,491,835) | 560 ppm | 95 | >5000 | >5000 |
| Surfactant V of Example 1 (U.S. Pat. No. 3,491,835) | 560 ppm | >5000 | >5000 | >5000 |
| Surfactant VIII (U.S. Pat. No. 3,467,195) | 560 ppm | >5000 | >5000 | >5000 |
| Surfactant IX | 560 ppm | >5000 | >5000 | >5000 |
| Surfactant X | 560 ppm | >5000 | >5000 | >5000 |
| 80/20 (weight) blend of T-DET N-407 ® and Surfactant V of Example 1 (a preferred surfactant blend of U.S. Pat. No. 4,246,919) | 560 ppm | 95 | >5000 | >5000 |
| Blend 8 - 60/40 (weight) blend of Surfactant I of Example 1 and | 470 ppm | 45 | 240 | 965 |

| Emulsifying Agent* | Concentration | Thinning Effectiveness: Initial Viscosity cP, 25° C. | Emulsion Stability: Viscosity, cP, 25° C. after | |
|---|---|---|---|---|
| | | | 2 Hours | 6 Hours |
| Surfactant XI | | | | |

*Surfactant VIII - Nonylphenoxypoly(ethyleneoxy)ethanol, - $C_9H_{19}C_6H_4(OCH_2CH_2)_{10}OH$, (Triton N-101, Rohm and Haas).
Surfactant IX - Dowfax 2A1, Dow Chemical Co.

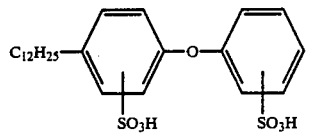

Surfactant X - Miranol C2M-SF, Miranol Chemical Co., Inc. Dayton, NJ 08810; a dicarboxylic coconut derivative of imidazoline of the formula

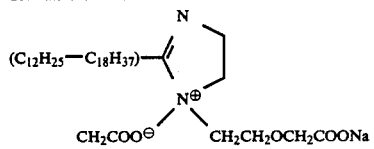

Surfactant XI - Nonylphenoxypoly(ethyleneoxy)ethanol, 4-$C_9H_{19}C_6H_4(OCH_2CH_2)_{30}OH$, (Alipal CO-887, GAF Corp.)
T-DET N-407, $C_9H_{19}C_6H_4(OCH_2CH_2)_{40}OH$, Thompson Hayward Chemical Co.

EXAMPLE 2

The effect of varying surfactant ratio of Blend 2 of Example 1 was determined employing the same California heavy crude oil designated as Oil Type A below and a second California heavy crude, Type B, by the method of Example 1, except that the ratio of surfactants in the blend is as shown below.

| Ratio of Surfactant I/II (Total = 560 ppm) | Oil Type | Thinning Effectiveness[1] | Emulsion Stability[2] |
|---|---|---|---|
| 0/100 | A | 200 | 4200 |
| 25/75 | A | 240 | 3100 |
| 50/50 | A | 300 | 1100 |
| 75/25 | A | 7280 | N.A.[3] |
| 100/0 | A | 9450 | N.A.[3] |
| 50/50 | B[4] | 300 | 700 |

Footnotes:
[1]Initial viscosity at 25° C., centipoise.
[2]Viscosity after standing at 25° C. for six hours, centipoise.
[3]N.A. = Not applicable.
[4]California heavy crude oil, 11-12 API gravity, viscosity at 33° C. is 15,000 centipoise.

EXAMPLE 3

The effect of varying the total weight of surfactants employing Blend 2 of Example 1 was carried out with a 12° API Central California heavy crude oil having Brookfield viscosity (centipoise) as follows:
at 25° C.: >20,000 cps.
at 33° C.: 18,500 cps.
at 40° C.: 6,320 cps.
and a paraffin/asphaltene ratio of 10.9. The method employed was that of Example 1, except that emulsion stability was determined after standing for two hours, rather than six hours. The percent of phase separation after the emulsion stood for two hours was also recorded. The results are summarized below.

Effect of Concentration of Blend 2 on Emulsion Viscosity and Stability

| Amount of Blend 2, ppm Based on Weight of Emulsion | Initial Viscosity, (Centipoise) | Viscosity After Two Hours at 25° C. (Centipoise) | % Phase Separation After Two Hours |
|---|---|---|---|
| None | >20,000 | >20,000 | 100 |
| 280 | 130 | 600 | 32 |
| 560 | 180 | 400 | 20 |
| 1120 | 160 | 400 | 10 |

EXAMPLE 4

The effect of various surfactant blends, each at 560 ppm (based on weight of emulsion) on the viscosity and stability of 70:30 (oil:water) emulsions of a northern Montana heavy crude oil was determined by the above method. The heavy crude oil used had the viscosity shown below:
at 70° F. (22° C.): 12,000 cps.
at 100° F. (38° C.): 2,700 cps.
at 120° F. (49° C.): 1,100 cps.
In each case, duplicate emulsions were prepared in the Waring Blender at 140° F. (60° C.) employing tap water and brine containing 5% by weight total dissolved solids (TDS). Emulsion viscosity was determined after cooling to 25° C. and phase separation per hour was determined over a two-hour period. The results are summarized below:

Initial Viscosity and Stability of Northern Montana Heavy Crude Oil Emulsions (70:30 water/oil) with Various Surfactant Blends at 800 ppm (based on weight of oil)

| Surfactant Blend* | Initial Viscosity, cps. | | Phase Separation (%/Hr.) | |
|---|---|---|---|---|
| | Tap H$_2$O | 5% TDS Brine | Tap H$_2$O | 5% TDS Brine |
| Blend 1 of Example 1 | 62 | 74 | 18 | 23 |
| Blend 2 of Example 1 | 214 | 70 | 28 | 31 |
| Blend 4 | 108 | 84 | 21 | 33 |
| Blend 5 | 70 | 35 | 37 | 69 |

*Blend 4 - a 50:50 (weight) mixture of surfactant I, above, and surfactant IV of Example 1, nonylphenoxypoly(ethyleneoxy)ethanol (Triton N-998, Rohm and Haas, Philadelphia, PA 19105).
Blend 5 - a 50:50 (weight) mixture of surfactant I, above, and octylphenoxypoly(ethyleneoxy)ethanol, $C_8H_{17}C_6H_4O(CH_2CH_2O)_{10}H$ (Triton X-100, Rohm and Haas, Philadelphia, PA 19105).

EXAMPLE 5

A highly asphaltic Peruvian heavy crude oil, 280 g, 10% TDS brine, 120 g and 560 ppm (0.224 g) of a 50/50 surfactant blend (by weight) was emulsified and the initial Brookfield viscosity measured as in Example 1 to determine the thinning effectiveness of the surfactant blend at 25° C. The emulsion was then shaken for 24 hours at 27° C. at a rate of 150 cycles/minute to determine emulsion stability based on oil coalescence by determination of oil globule size. A globule size of less than 2 millimeters under these conditions (size 1) passes the test.

| Surfactant Blend | Thinning Effectiveness, Viscosity at 25° C. (Centipoise) | Emulsion Stability after 24 Hours, Shaker Test |
|---|---|---|
| None | >20,000 | Not Applicable |
| 112 mg each of nonylphenoxytri(ethyleneoxy)ethanol sulfate and ethylene oxide, propylene oxide block copolymer (40% ethylene oxide) (Blend 3 of Example 1) | 230 | 1-2 |
| 112 mg each of ethylene oxide, propylene oxide block copolymer (40% ethylene oxide), (V of Example 1) and disodium [($C_8H_{17}$—$C_{18}H_{37}$)—4-(sulfonylphenoxy)]-benzenesulfonate* - Blend 9 | 230 | 1 |

*Eleminol MON-7, a registered trademark of Sanyo Chemical KK.

EXAMPLE 6

The Effect of Total Concentration of Surfactant Blend 2 on Emulsion Stability with California Heavy Crude Oil Mixtures of 380 g crude oil, 163 g 10% (w/w) brine and 70, 140, 280 or 560 ppm by weight, based on total weight of emulsion, of Surfactant Blend 2 [a 50/50 (w/w) blend of surfactants I and II of Example 1] were emulsified by pumping the mixture through a 0.25 inch (0.635 cm) diameter tubing loop at 1000 sec$^{-1}$ wall shear for five minutes. The initial appearance and viscosity were obtained as in Example 1 and the emulsion was then pumped through the tube at 500 sec$^{-1}$ wall shear and the appearance and water breakout noted after passing through 25 feet of the tubing. The results are summarized below:

| Surfactant Blend 2, ppm* | Initial Viscosity of Emulsion, (centipoise) | Emulsion Appearance | | Water Breakout |
|---|---|---|---|---|
| | | Initial | After 25 ft. of tubing | |
| 70 | 130 | Smooth | Considerable coalescence | 170 ml clear after 10 minutes |
| 140 | 100 | Smooth | Slight coalescence | 170 ml clear after 30 minutes |
| 280 | 80 | Smooth | Smooth | 160 ml muddy after 20 hours |
| 560 | 90 | Smooth | Smooth | 150 ml muddy after 20 hours |

*based on weight of emulsion.

EXAMPLE 7

Emulsion Stability With a California Heavy Crude

Employing a Cat Canyon, California heavy crude, viscosity 7860 cps. at 70° F. (21° C.) 70:30 oil/brine emulsions (brine contained 6260 ppm TDS, 42 ppm hardness) containing from 140 to 840 ppm surfactant blend were prepared by pumping the mixture at 80° F. (27° C.) for 30 seconds through a 0.25 inch (0.635 cm) diameter tubing loop at 1000 sec$^{-1}$ shear. Pumping at 500 sec$^{-1}$ shear rate was then continued until the emulsion broke. The breakdown time for emulsions tested in this manner are summarized below.

| Surfactant Blend Concentration, ppm* | Breakdown Time, Hours | |
|---|---|---|
| | Blend 1 of Example 1 | Blend 2 of Example 1 |
| 140 | 0.25 | — |
| 280 | 0.50 | 0.6 |
| 420 | 0.75 | — |
| 560 | 1.4 | 1.5 |
| 840 | 1.5 | 1.7 |

*Based on weight of emulsion.

EXAMPLE 8

Performance with South American Heavy Crude Oil

A South American crude oil having a Brookfield Viscosity of 11,000 cps. at 20° C. and 2,800 cps. at 27° C. and a paraffin/asphaltene ratio of 4.1 was emulsified in brine containing 6.7% or 9.1% total dissolved solids with three different surfactant blends as shown below.

In each case the emulsions contained 70% oil and 30% brine be weight and 560 ppm of surfactant blend. Emulsions were prepared in a Waring Blender at 60° C., cooled to 25° C. and the initial Brookfield Viscosity determined using spindle #3 at 6 rpm. The emulsion stability was determined by the oil droplet size after shaking for 24 hours at 27° C. as described in Example 5. The results are summarized below.

| Surfactant Blend (560 ppm) | Brine, % TDS | Initial Emulsion Viscosity, cps. | Emulsion Stability at 24 hours, droplet size |
|---|---|---|---|
| Blend 6-a 50:50 (weight) blend of Surfactant X of Example 1A and Surfactant II of Example 1 | 6.7 | 40 | completely coalesced |
| Blend 4 of Example 4 | 6.7 | 420 | 2–5 mm |
| Blend 4 of Example 4 | 9.1 | 230 | 2 mm |
| Blend 7-a 50:50 (weight) blend of Eleminol MON-7* and Surfactant IV of Example 1 | 9.1 | 230 | 1 mm |

*Eleminol ® MON-7, Sanyo Chemical Co. is a disodium alkyl-4-(sulfophenoxy)-benzenesulfonate of the formula

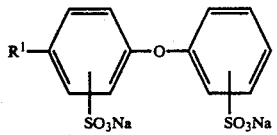

where $R^1$ is $C_8H_{17}$ to $C_{18}H_{37}$ which may be straight chain or branched.

EXAMPLE 9

Performance with Western Canada Bitumen

The procedure of Example 8 was repeated with a Western Canada Bitumen having Brookfield viscosity 34,800 cps. at 25° C. In addition to the initial viscosity and emulsion stability, the percent of separation after standing for 24 hours was determined. The results are summarized in the table below.

| Surfactant Blend* (ppm, by weight of emulsion) | Weight Ratio oil/water | Initial Emulsion Viscosity, cps. | Emulsion Stability at 24 hours | |
|---|---|---|---|---|
| | | | Drop Size After Shaking, mm | % Phase Separation on Standing |
| Blend 1 (280) | 70/30 | 180 | 5–10 | 100 |
| Blend 1 (560) | 70/30 | 100 | <1 | 6 |
| Blend 2 (280) | 70/30 | 160 | 5–10 | 100 |
| Blend 2 (420) | 70/30 | 1600 | <1 | 100 |
| Blend 2 (560) | 70/30 | 60 | <1 | 10 |
| Blend 4 (280) | 70/30 | 140 | 5–10 | 100 |
| Blend 4 (560) | 70/30 | 80 | <1 | 6 |
| Blend 7 (560) | 70/30 | 50 | 1–2 | 100 |
| Blend 2 (560) | 80/20 | 1250 | <1 | 3 |

*All surfactant blends are 50:50 by weight. Blends 1, 2 and 4 are as defined in Example 4. Blend 7 is as defined in Example 8.

EXAMPLE 10

Performance of Surfactant Blend 2 with Geisinger, California Heavy Crude

Samples of Geisinger, California heavy crude oil having a Brookfield viscosity of >10,000 centipoise (13.5° API) at 25° C. were emulsified in brine having 10% total dissolved solids at a ratio of 70 parts by weight of oil and 30 parts by weight brine, with the surfactant blend indicated below at 280 ppm of each component (total surfactant blend, 560 ppm based on total weight of emulsion). The initial viscosity (csp) and phase separation upon standing at 25° C. was determined. The results are summarized below.

| Surfactant Blend** (560 ppm) | Initial Emulsion Viscosity, at 25° C., cps.* | Phase Separation ml/hour |
|---|---|---|
| None | >10,000 | — |
| Blend 2 | 600 | 0.9 |

*Using a Brookfield Viscometer, LVT, spindle #3 at 6 rpm, and 25° C.
**Blend 2 is an equal weight mixture of Alipal ® CO436 and Triton ® X-305 brands of surfactants I and II, respectively, as defined in Example 1.

EXAMPLE 11

Downhole Emulsification Trial at Reward Field, McKittrick, Calif.

A marginally productive well in a field under steam drive was employed which during a pretrial period of 26 days had an average daily oil production of 0.7 barrels with an average gravity of 12° API [0.986 g/cm³] and average Brookfield viscosity >20,000 cps. The viscosity of various samples of this crude oil was reduced to 130 to 180 cps. with 280–560 ppm of Surfactant Blend 2* by the method of Example 1. During the 10 day trial period an aqueous solution of Blend 2* was continuously injected down the annulus. The fluid produced during this period contained, on the average, 36% of aqueous phase and 64% oil, by weight and 500 ppm surfactant blend, by weight. The average fluid production of the well increased 240% and the oil production increased by 450%. The average wellhead temperature was 30° C. In addition, the surface flowline pressure was reduced from a pretrial 300 psig to 26 psig during the trial period.

*The surfactant blend employed was a 5% aqueous solution of equal parts by weight of the active ingredients: (A¹) sulfated nonylphenoxy-tri(ethyleneoxy)ethanol (Alipal ®CO436 from GAF Corporation, New York, NY 10020) and (B) octylphenoxypoly(ethyleneoxy)ethanol with 30 moles of ethylene oxide (Triton ®X-305, from Rohm and Haas, Philadelphia, PA 19105.) It was pumped into the annulus at a rate calculated to give the desired level of surfactant blend, oil and water.

During a 15 day post trial period oil production dropped to 1.2 bbl/day which is still 70% above the pretrial rate. The data are summarized in the table, below.

| SUMMARY OF AVERAGED DATA FROM TRIAL AT REWARD FIELD WELL, MCKITTRICK, CALIFORNIA, WITH SURFACTANT BLEND 2(500 ppm) | | | | | |
|---|---|---|---|---|---|
| | Fluid per day, Barrels | Oil per day, Barrels | Flowline pressure, psig | Viscosity, cps** | Ambient Temp., °C., High/Low |
| Pretrial (26 Days) | 1.8 | 0.7 | 300 | 20,000 | 9.5/−0.6 |
| Trial (10 Days) | 6.1 | 3.9 | 26 | 10–20 | 13/2 |
| Post-trial (28 Days) | 5.0 | 1.2 | 177 | 41,200 | 19/6 |

**Using a Brookfield Viscometer, LV#3 spindle at 60 rpm, HA#4 spindle at 10 rpm.

EXAMPLE 12

Downhole Emulsification Trial at Midway-Sunset Field, Fellows, Calif.

This trial was carried out with a well in a field undergoing cyclic steam stimulation. The well was already moderately productive, yielding an average of 6 barrels of oil per day during the eight day pretrial period, having consistent Brookfield viscosity at 40° C. of 29,000 cps. On the 9th day continuous injection of 310 ppm (based on weight of total fluid) of surfactant Blend 2 was started. Since the viscosity remained high (28,400 cps.), the level of Blend 2 was increased to 455 ppm on day 10 and 520 ppm on day 11, during which period the viscosity dropped to 12,800 cps. (day 10) and 12 cps. (day 11). Dosing was maintained at about 520 ppm until day 13 on which it was further increased to 730 ppm and maintained at 700 to 910 ppm until the end of the trial period on day 18. During days 11-18 the viscosity remained low (12-90 cps.) except for readings of 5200 and 2000 on day 12.

During the 10 day trial period, fluid production increased by 30% and oil production by 63% to an average of 9.8 barrels per day. During the trial period the wellhead temperature was 39° C. The results are summarized below.

period injecting in place of the light oil, an aqueous solution of an 80:20 weight ratio (of active components) of a blend of Alipal CO-436 ® and Triton X-100 ® to give an emulsion containing 60% water/40% crude oil by weight and having from 300 to 750 ppm of said blend based on total emulsion weight. ®Alipal CO-436, GAF Corporation, New York, NY 10020 is sulfated nonylphenoxytri(ethyleneoxy)ethanol; Triton X-100, Rohm and Haas, Philadelphia, PA 19105 is octylphenoxypoly(ethyleneoxy)ethanol, $C_8H_{17}C_6H_4O(CH_2CH_2O)_{10}H$.

| SUMMARY OF RESULTS FROM TRIAL AT FOREST HILLS FIELD, QUITMAN, TEXAS, WITH 80:20 (w/w) SURFACTANT BLEND OF ALIPAL CO-436 ® AND TRITON X-100 ® AT 300 TO 750 PPM* | | |
|---|---|---|
| | Standard Light Oil Diluent Method Over 14 Days | Trial with Surfactant/Water Emulsification Over 6 Days |
| Fluid Viscosity, cps. | 625-17,600 | 50-100 |
| Wellhead Pressure, psig. | 100-350 | 50-100 |
| Flowline Pressure, psig. | 130-350 | 75-125 |
| Oil Production, barrels/day | 57-70 | 60-74 |

*Based on weight of active surfactants per weight of total fluid.

EXAMPLE 14

When the procedures of Examples 1 through 10 are carried out but employing the oil to water ratios set forth below, the results are substantially the same.

Weight ratio, oil/water

20/80
30/70
40/60
60/40
80/20

EXAMPLE 15

When the procedures of Examples 1 through 10 are

| SUMMARY OF AVERAGED DATA FROM TRIAL AT MIDWAY-SUNSET FIELD, FELLOWS, CALIFORNIA WITH SURFACTANT BLEND 2 AT 440 TO 1300 ppm | | | | | |
|---|---|---|---|---|---|
| | Fluid per day, Barrels | Oil per day, Barrels | Flowline pressure, psi | Viscosity, cps. | Ambient Temp., °C., High/Low |
| Pretrial (8 Days) | 13 | 6 | 130 | 29,000 | 26/7 |
| Trial (10 Days) | 17 | 9.8 | 100 | 540# | 19/7 |
| Post-Trial (5 Days) | 12 | 6 | 290 | 21,800## | 19/7 |

*Using a Brookfield Viscometer, HA#4 spindle at 10 rpm.
During days 13-18 the viscosity remained in the range of 12-90 cps.
The post-trial viscosity ranged from 13,200 cps. on day 19 to 31,360 cps. on day 22, the final reading taken.

EXAMPLE 13

Downhole Emulsification Trial at Forest Hills Field, Quitman, Tex.

This trial was carried out in a field undergoing in-situ combustion with a productive well that could only be produced using a light oil diluent. The crude oil, 9.5-10 API gravity, had a viscosity >100,000 cps. at room temperature. The light oil diluent used was 35° API gravity, viscosity ~10 cps. at 25° C. The wellhead temperature during the trial was 23° C. The table below summarizes the results obtained with the standard light oil diluent method (40% light oil/60% crude oil by volume) over a two-week period and, by comparison, the results obtained during a subsequent six-day trial repeated but employing the indicated surfactant blend at levels from 100 to 1500 parts by weight per million parts by weight of emulsion, oil-in-water emulsions which exhibit substantial reduction in viscosity and facile separation of the oil phase are likewise obtained.

EXAMPLE 16

When the procedures of Examples 1 through 10 are carried out employing weight ratios of surfactant (A) to (B) or (A) to (C) as indicated in the table, below, substantially similar results are likewise obtained.

equal parts by weight of the following active ingredients, satisfactory results are also observed.

| Surfactant (A) | Surfactant (C) [HLB] |
|---|---|
| 4-n-$C_9H_{19}C_6H_4(OCH_2CH_2)_4OSO_3Na$ | $H(OCH_2CH_2)_{39}(OCH_2CH)_{54}(OCH_2CH_2)_{39}OH$ [13]<br>　　　　　　　　　　　$|$<br>　　　　　　　　　　　$CH_3$ |
| 4-n-$C_8H_{17}C_6H_4(OCH_2CH_2)_6OSO_3NH_4$ | $H(OCH_2CH_2)_{31}(OCH_2CH)_{54}(OCH_2CH_2)_{31}OH$ [13]<br>　　　　　　　　　　　$|$<br>　　　　　　　　　　　$CH_3$ |
| 4-n-$C_8H_{17}C_6H_4(OCH_2CH_2)_8OSO_3NH_4$ | $H(OCH_2CH_2)_{21}(OCH_2CH)_{47}(OCH_2CH_2)_{21}OH$ [13.5]<br>　　　　　　　　　　　$|$<br>　　　　　　　　　　　$CH_3$ |
| 4-n-$C_9H_{19}C_6H_4(OCH_2CH_2)_{10}OSO_3Na$ | $H(OCH_2CH_2)_{27}(OCH_2CH)_{39}(OCH_2CH_2)_{27}OH$ [16]<br>　　　　　　　　　　　$|$<br>　　　　　　　　　　　$CH_3$ |
| 4-n-$C_9H_{19}C_6H_4(OCH_2CH_2)_5OSO_3Na$ | $H(OCH_2CH_2)_{24}(OCH_2CH)_{35}(OCH_2CH_2)_{24}OH$ [16.5]<br>　　　　　　　　　　　$|$<br>　　　　　　　　　　　$CH_3$ |
| 4-n-$C_8H_{17}C_6H_4(OCH_2CH_2)_4OSO_3Na$ | $H(OCH_2CH_2)_{10}(OCH_2CH)_{30}(OCH_2CH_2)_{10}OH$ [11]<br>　　　　　　　　　　　$|$<br>　　　　　　　　　　　$CH_3$ |
| 4-n-$C_9H_{19}C_6H_4(OCH_2CH_2)_4OSO_3Na$ | $H(OCH_2CH_2)_{19}(OCH_2CH)_{30}(OCH_2CH_2)_{19}OH$ [17]<br>　　　　　　　　　　　$|$<br>　　　　　　　　　　　$CH_3$ |
| 4-n-$C_9H_{19}C_6H_4(OCH_2CH_2)_4OSO_3Na$ | $H(OCH_2CH_2)_7(OCH_2CH)_{21}(OCH_2CH_2)_7OH$ [12]<br>　　　　　　　　　　　$|$<br>　　　　　　　　　　　$CH_3$ |
| 4-n-$C_9H_{19}C_6H_4(OCH_2CH_2)_4OSO_3Na$ | $H(OCH_2CH_2)_{11}(OCH_2CH)_{16}(OCH_2CH_2)_{11}OH$ [18.5]<br>　　　　　　　　　　　$|$<br>　　　　　　　　　　　$CH_3$ |
| 4-n-$C_9H_{19}C_6H_4(OCH_2CH_2)_2OSO_3Na$ | $H(OCH_2CH_2)_{27}(OCH_2CH)_{39}(OCH_2CH_2)_{27}OH$ [16]<br>　　　　　　　　　　　$|$<br>　　　　　　　　　　　$CH_3$ |
| 4-n-$C_9H_{19}C_6H_4(OCH_2CH_2)_8OSO_3NH_4$ | $H(OCH_2CH_2)_{24}(OCH_2CH)_{35}(OCH_2CH_2)_{24}OH$ [16.5]<br>　　　　　　　　　　　$|$<br>　　　　　　　　　　　$CH_3$ |

| | Parts by Weight | |
|---|---|---|
| Surfactant A | Surfactant B | Surfactant C |
| 15 | 85 | — |
| 30 | 70 | — |
| 40 | 60 | — |
| 60 | 40 | — |
| 70 | 30 | — |
| 85 | 15 | — |
| 30 | — | 70 |
| 45 | — | 55 |
| 55 | — | 45 |
| 65 | — | 35 |
| 70 | — | 30 |
| 85 | — | 15 |
| 15 | — | 85 |

EXAMPLE 17

When the procedures of Examples 1 and 4 are repeated but employing blends of surfactant wherein surfactant (A) is of the formula $Ar(OCH_2CH_2)_nOSO_3H$ where Ar is octylphenol or nonylphenyl, and the average number of ethylene oxide units, n, is a number of from 2 to 10, or a corresponding sodium or ammonium salt, emulsions having satisfactory mobility and exhibiting facile separation of the oil phase, are likewise obtained.

EXAMPLE 18

When the procedure of Example 5 is repeated by employing blends of surfactants, below, containing

I claim:
1. A method for transporting a viscous crude oil through a pipe which comprises forming an oil-in-water emulsion containing 20 to 80 percent by weight of said oil and 80 to 20 percent by weight of water in the presence of from 100 to 1500 parts by weight of a surfactant blend per million parts by weight of said emulsion, said blend comprising from 15 to 85 parts by weight of an anionic or amphoteric surfactant (A) selected from those of the formula $Ar(OCH_2CH_2)_nOSO_3H$,

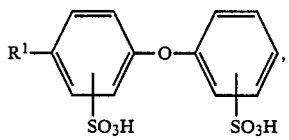

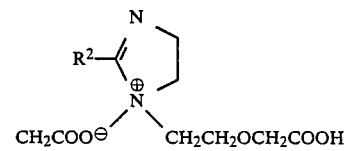

or a sodium or ammonium salt thereof; and from 85 to 15 parts by weight of a nonionic surfactant selected from (B) of the formula Ar(OCH$_2$CH$_2$)$_p$OH, or
(C) of the formula

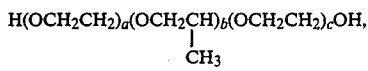

said surfactant (C) having an HLB value of from 10 to 20;
where Ar is octylphenyl or nonylphenyl,
n is a number from 2 to 10,
p is a number from 10 to 100,
a is a number from 10 to 40,
b is a number from 15 to 55,
c is a number from 10 to 40,
R$^1$ is C$_8$ to C$_{18}$ alkyl and
R$^2$ is C$_{12}$ to C$_{18}$ alkyl.

2. The method of claim 1 wherein said emulsion contains 50 to 75 percent by weight of said oil and 50 to 25 percent by weight of water.

3. The method of claim 1 wherein said blend comprises from 20 to 80 parts by weight of surfactant (A) and from 80 to 20 parts by weight of surfactant (B) or surfactant (C).

4. The method of claim 1 wherein said surfactant blend is present in from 200 to 1000 parts by weight per million parts by weight of said oil.

5. The method of claim 1 wherein (A) is Ar-(OCH$_2$CH$_2$)$_n$OSO$_3$H or a sodium or ammonium salt thereof.

6. The method of claim 5 wherein said nonionic surfactant is (B).

7. The method of claim 6 wherein said blend consists of from 50 to 80 parts by weight of surfactant (A) and from 50 to 20 parts by weight of surfactant (B).

8. The method of claim 7 comprising 50 to 75 percent by weight of said oil and 50 to 25 percent by weight of water and said surfactant blend is present in from 200 to 1000 parts by weight per million parts by weight of said emulsion.

9. The method according to claim 8 wherein said anionic surfactant (A$^1$) is 4-C$_9$H$_{19}$C$_6$H$_4$(OCH$_2$CH$_2$)$_4$OSO$_3$H and said nonionic surfactant (B) is 4-C$_8$H$_{17}$C$_6$H$_4$(OCH$_2$CH$_2$)$_p$OH where p is 10, 30 or 70 or is 4-C$_9$H$_{19}$C$_6$H$_4$(OCH$_2$CH$_2$)$_p$OH where p is 100.

10. The method of claim 9 wherein said blend consists of 50 parts by weight of surfactant (A) and 50 parts by weight of surfactant (B).

11. The method of claim 9 wherein said blend consists of 80 parts by weight of surfactant (A) and 20 parts by weight of surfactant (B).

12. The method of claim 1 wherein said nonionic surfactant is (C) having an HLB value of 12 to 16.

13. The method of claim 12 wherein (A) is Ar-(OCH$_2$CH$_2$)$_n$OSO$_3$H or a sodium or ammonium salt thereof and equal parts by weight of surfactants (A) and (C) are employed.

14. The method of claim 1 wherein said surfactant blend comprises 50 parts by weight of an amphoteric surfactant of the formula

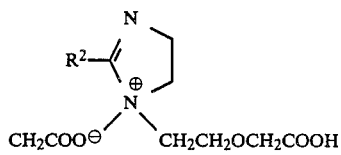

a sodium or ammonium salt thereof, and 50 parts by weight of the nonionic surfactant 4-C$_8$H$_{17}$C$_6$H$_4$(OCH$_2$CH$_2$)$_{30}$OH, or said blend comprises 50 parts by weight of an anionic surfactant of the formula

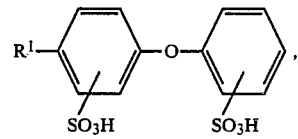

or the disodium salt thereof and 50 parts by weight of the nonionic surfactant 4-C$_9$H$_{19}$C$_6$H$_4$(OCH$_2$CH$_2$)$_{100}$OH;
R$^1$ is C$_8$ to C$_{18}$alkyl and
R$^2$ is C$_{12}$ to C$_{18}$alkyl.

15. The method of claim 14 comprising 50 to 75 percent by weight of said oil and 50 to 25 percent by weight of water and said surfactant blend is present in from 200 to 1000 parts by weight per million parts by weight of said emulsion.

* * * * *

UNITED STATES PATENT AND TRADEMARK OFFICE
CERTIFICATE OF CORRECTION

PATENT NO. : 4,757,833
DATED : July 19, 1988
INVENTOR(S) : Dennis E. Danley

It is certified that error appears in the above-identified patent and that said Letters Patent is hereby corrected as shown below: Title page:

In the Abstract:

line 3, "10 to 80%" should read -- 20 to 80% --.

Column 6, line 33:
"Example 12" should read -- Example 1 --;

Column 13, line 48:
"1600" should read -- 160 --; and

Column 16, line 24:
insert -- The trial demonstrated that the surfactant blend/water downhole emulsification method for producing this crude oil eliminated viscous plug tubing blockages. It is a considerably more economical method than the use of costly light oil as diluent --.

Signed and Sealed this

Twentieth Day of December, 1988

Attest:

DONALD J. QUIGG

Attesting Officer

Commissioner of Patents and Trademarks